E. D. ROY.
ROCK SHAFT BEARING.
APPLICATION FILED JAN. 28, 1916.
1,186,840.
Patented June 13, 1916.
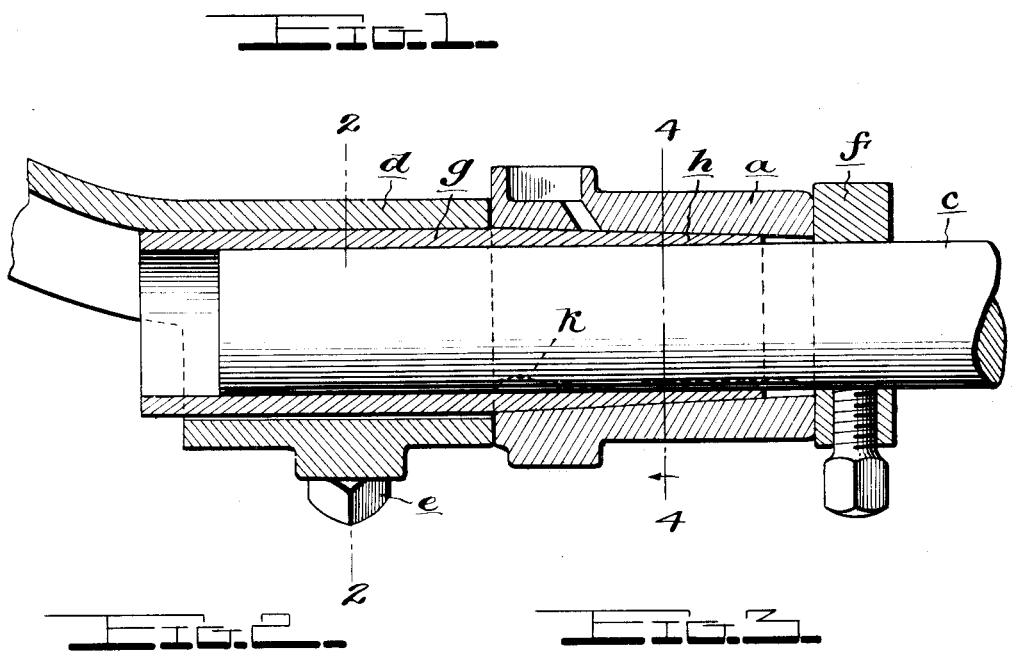
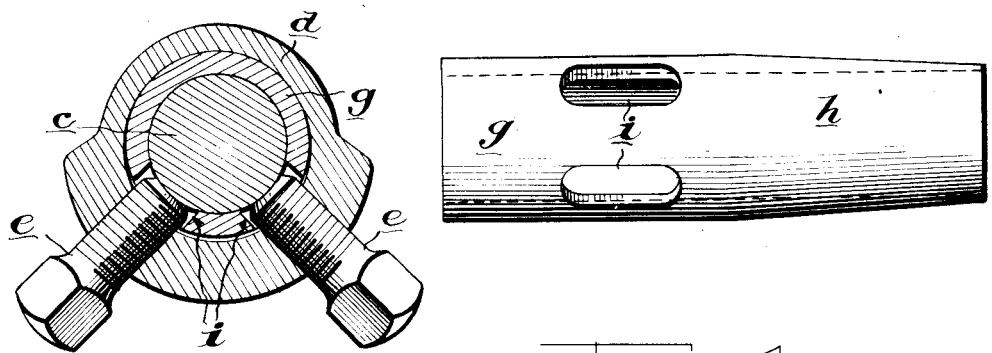
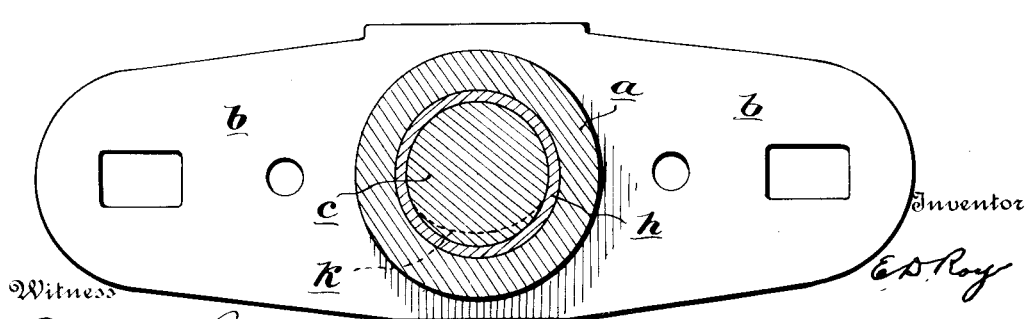
Witness
Chas. L. Griestaner.
Inventor
E. D. Roy
By Davis & Davis
Attorneys

UNITED STATES PATENT OFFICE.

EDWARD D. ROY, OF GREENVILLE, SOUTH CAROLINA, ASSIGNOR OF ONE-HALF TO HAZEL L. SCAIFE AND ONE-FOURTH TO MARION R. CASEY, BOTH OF CLINTON, SOUTH CAROLINA.

ROCK-SHAFT BEARING.

1,186,840.     Specification of Letters Patent.     Patented June 13, 1916.

Application filed January 28 1916. Serial No. 74,775.

*To all whom it may concern:*

Be it known that I, EDWARD D. ROY, a citizen of the United States of America, and a resident of Greenville, county of Greenville, State of South Carolina, have invented certain new and useful Improvements in Rock-Shaft Bearings, of which the following is a full and clear specification.

The object of this invention is to provide simple means for taking up the wear in a rock shaft bearing and at the same time preserve the shaft against all wearing action, the construction of the device being such that it may be advantageously used for repairing rock shaft bearings in which the shaft has been greatly worn, thereby enabling the old shaft and bearing box to be continued in use, as more fully hereinafter set forth.

In the drawings—Figure 1 is a vertical longitudinal sectional view of my device; Fig. 2 is a transverse section on the line 2—2 of Fig. 1; Fig. 3 is a detail side elevation of the wear-take-up sleeve; and Fig. 4 is a transverse section on the line 4—4 of Fig. 1.

In the drawings, $a$ designates a cylindrical bearing box or casing which is adapted to be supported and held against rotation in any suitable manner, preferably by means of the lateral lugs $b$ which are adapted to be bolted to a loom or other frame in which my device may be employed.

Extending through the box $a$ is a rock shaft $c$, and clamped to the end of this rock shaft, beyond the box $a$, is a sleeve $d$ which may be a part of the loom mechanism, as shown, or a simple sleeve. This sleeve is fastened to the shaft by one or more set screws $e$, two being shown in the present instance, which set screws pass through the sleeve and abut against the shaft. The shaft is held against longitudinal movement of the box $a$ by means of said sleeve $d$ and a collar $f$ or other suitable means, such, for instance, as a bearing (similar to my present bearing or otherwise) attached to the shaft at its other end.

Fastened in the sleeve $d$, between the shaft and the interior of the sleeve, is a cylindrical bushing $g$, whose tapered extension $h$ extends into the box $a$, the interior of the box being tapered to correspond with the exterior taper of the part $h$. This bushing $g$ fits the shaft $c$, as shown, and is capable of sliding thereon. Set screws $e$ pass through longitudinal slots $i$ formed in the bushing $g$. The wear takes place between the exterior of the tapered part $h$ and the bearing box $a$, and to compensate for the wear bushing $g$ is pushed farther into the box $a$, as is obvious. To enable this to be done the set screws $e$ are loosened slightly and the bushing is tapped lightly on the end. It will be observed that the bushing $g$ is clamped in position by the clamping action that is exerted on the shaft by means of the set screws.

A feature of importance in this construction is that it may be readily applied to worn rock shaft bearings, especially in bearings used for the rocker shafts in looms. I have shown in dotted line at $k$ in Figs. 1 and 4 how the shaft usually wears in these rocker bearings. When the shaft is thus worn, both the shaft and the bearing box are usually removed and junked and new parts substituted. With my device, the shaft and the bearing box may be saved by simply reaming out the bearing box as well as the sleeve or collar part $d$ to receive the bushing $g$. It will be observed that the tapered part of the bushing covers practically the entire length of the worn part of the shaft, and that after the insertion of the bushing $g$ the shaft is entirely relieved of wear, and that also, as the wear takes place, a slight adjustment of the bushing will compensate for it and thus greatly extend the life of the bearing. When a worn bearing is thus repaired, the worn part of the shaft forms a cavity between the surface of the shaft and the interior of the bushing; I have found in practice that this cavity has the advantage that it serves as a grease chamber.

Having thus described my invention, what I claim is:

1. In a device of the class set forth, a bearing box tapered interiorly, a shaft extending therethrough, a collar or sleeve surrounding one end of the shaft, a bushing surrounding the shaft between said collar and the shaft, said bushing having one end tapered and entering the bearing box, and means for clamping the collar and the bushing adjustably to the shaft.

2. In a device of the class set forth, a bearing box tapered interiorly, a shaft extending therethrough, a collar or sleeve surrounding one end of the shaft, a bushing surrounding the shaft between said collar and the shaft, said bushing having one end tapered and entering the bearing box, and means for clamping the collar and the bushing adjustably to the shaft, said means consisting of a set screw threaded through the collar and extending through a longitudinal slot in the bushing, whereby the bushing may be clamped to the collar through the medium of the shaft and said set screw.

In testimony whereof I hereunto affix my signature.

EDWARD D. ROY.